(12) United States Patent
Oldorff

(10) Patent No.: US 9,199,449 B2
(45) Date of Patent: Dec. 1, 2015

(54) METHOD FOR PRODUCING A SAME PATTERN USING A SIMPLE PRINT AND DEVICE THEREOF

(71) Applicant: FLOORING TECHNOLOGIES LTD, Pieta (MT)

(72) Inventor: Frank Oldorff, Schwerin (DE)

(73) Assignee: FLOORING TECHNOLOGIES LTD, Pieta (MT)

(*) Notice: Subject to any disclaimer, the term of this patent is extended or adjusted under 35 U.S.C. 154(b) by 9 days.

(21) Appl. No.: 14/484,954

(22) Filed: Sep. 12, 2014

(65) Prior Publication Data

US 2015/0070413 A1 Mar. 12, 2015

Related U.S. Application Data

(62) Division of application No. 11/748,776, filed on May 15, 2007, now Pat. No. 8,833,259.

(30) Foreign Application Priority Data

May 16, 2006 (DE) .......................... 10 2006 022 774

(51) Int. Cl.
*B41M 3/00* (2006.01)
*B41J 2/01* (2006.01)
(Continued)

(52) U.S. Cl.
CPC ... *B41J 2/01* (2013.01); *B41F 9/00* (2013.01); *B41J 3/407* (2013.01); *B41J 11/0015* (2013.01); *B41M 1/10* (2013.01); *B41M 3/008* (2013.01); *B44C 5/04* (2013.01); *E04F 13/08* (2013.01); *E04F 15/02* (2013.01); *G06K 15/025* (2013.01);
(Continued)

(58) Field of Classification Search
USPC ........................................................ 101/485
See application file for complete search history.

(56) References Cited

U.S. PATENT DOCUMENTS

| 2,043,809 A | 6/1936 | Papp |
| 2,477,300 A | 7/1949 | Karfoil et al. |

(Continued)

FOREIGN PATENT DOCUMENTS

| CA | 2300891 | 3/1999 |
| DE | 19736605 | 2/1999 |

(Continued)

OTHER PUBLICATIONS

Farbmanagement und Rastererhalt in einem Proof in Druckspiegel; Jan. 2003; pp. 20-22.

(Continued)

*Primary Examiner* — Jill Culler

(74) *Attorney, Agent, or Firm* — Andrew M. Calderon; Roberts Mlotkowski Safran & Cole, P.C.

(57) ABSTRACT

A method for producing a pattern, in particular a wood pattern, on the face of a woodbased-material board. The pattern is preset with the aid of a digital data set and applied to the woodbased-material board via an intaglio printing process. The pattern is covered with at least one synthetic resin layer and pressed with the woodbased-material board. The digital data set is used to produce a sample print by use of an inkjet printing process, which print is used to compare with the pattern print on the woodbased-material board in terms of optical appearance. The materials and/or printing conditions used in the pattern printing and the sample printing are coordinated with one another.

15 Claims, 2 Drawing Sheets

(51) Int. Cl.
  *G06K 15/02* (2006.01)
  *B41J 3/407* (2006.01)
  *B41J 11/00* (2006.01)
  *B41M 1/10* (2006.01)
  *B44C 5/04* (2006.01)
  *E04F 13/08* (2006.01)
  *E04F 15/02* (2006.01)
  *B41F 9/00* (2006.01)
  *B41M 5/00* (2006.01)
  *E04F 15/04* (2006.01)

(52) U.S. Cl.
  CPC ............... *B41M 5/00* (2013.01); *B41P 2200/30* (2013.01); *E04F 15/04* (2013.01); *Y10S 101/43* (2013.01)

(56) References Cited

U.S. PATENT DOCUMENTS

| | | |
|---|---|---|
| 3,842,738 A | 10/1974 | Terrazas et al. |
| 5,282,417 A | 2/1994 | Germann |
| 5,521,722 A | 5/1996 | Colvill et al. |
| 5,881,648 A | 3/1999 | Pavlin |
| 5,980,136 A | 11/1999 | Teumer et al. |
| 6,019,046 A | 2/2000 | Rodi |
| 6,927,876 B1 * | 8/2005 | Kondo .......................... 358/1.9 |
| 2003/0218663 A1 | 11/2003 | Baxter et al. |

FOREIGN PATENT DOCUMENTS

| | | |
|---|---|---|
| EP | 0737570 | 10/1996 |
| EP | 1454763 | 9/2004 |
| EP | 1145863 | 10/2005 |
| EP | 1628467 | 2/2006 |
| WO | WO 03075215 A2 * | 9/2003 |

OTHER PUBLICATIONS

Digitaler Kontraktproof von Rasterdaten; Jan. 4, 2004, 2 pages.
Gerasteter Digitalproof; Apr. 2006. 3 pages.

* cited by examiner

FIG. 1a
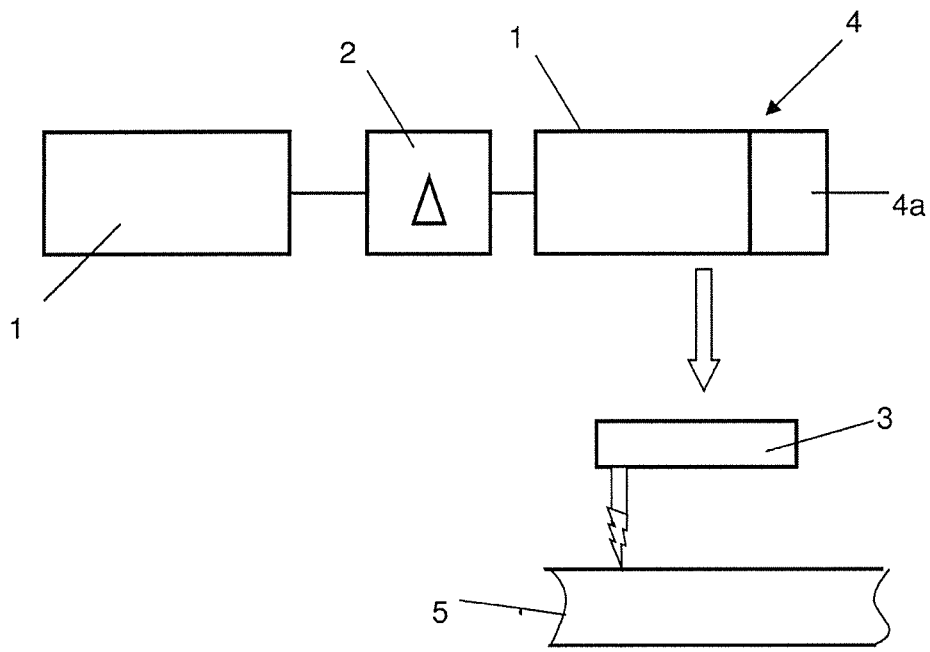
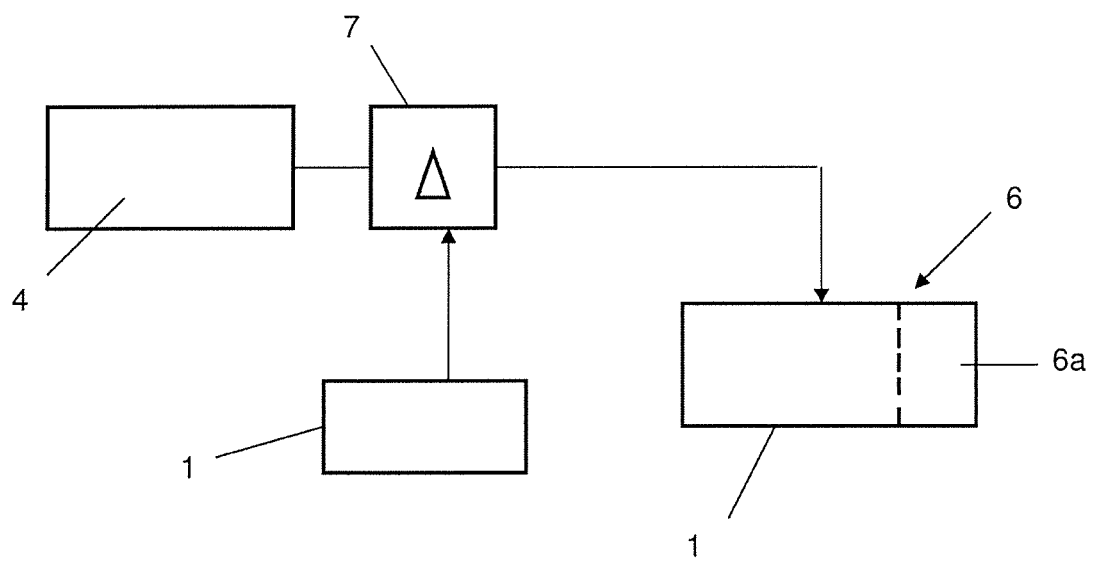
FIG. 1b

METHOD FOR PRODUCING A SAME PATTERN USING A SIMPLE PRINT AND DEVICE THEREOF

CROSS-REFERENCE TO RELATED APPLICATIONS

The present application claims priority under 35 U.S.C. §119 of German Patent Application No. 10 2006 022 774.3, filed on May 16, 2006, and U.S. application Ser. No. 11/748, 776 filed on May 15, 2007, the disclosure of which is expressly incorporated by reference herein in its entirety.

BACKGROUND OF THE INVENTION

1. Field of the Invention

The invention relates to a method for producing a same pattern and an installation for printing, coating and pressing two different base materials with the same pattern, which is covered with a synthetic resin and subsequently pressed therewith.

2. Discussion of Background Information

Base materials, in particular woodbased-material boards, provided with a pattern, are generally used as surface elements for cladding floors, walls and ceilings. In particular, when woodbased-material boards are used as floor-covering elements, wood grain, tile patterns, parquet imitations and fantasy patterns are used as patterns.

In particular, when the desired patterns are a single-piece production, the purchaser or customer would like to inspect the desired motif on a sample or sample workpiece before the entire batch is completed. Conventionally, a so-called proof paper is used for this purpose, i.e., the desired pattern is printed on a paper with the aid of an inkjet printer. This proof paper is then assessed for suitability and, if the outcome is positive, a further data set is produced with which, for instance, a print roller is produced which is used for the actual printing process of the pattern when printing the woodbased-material board.

However, with this approach the problem is encountered that the proof paper and the end product, the printed woodbased-material board, can ultimately produce a non-identical appearance of the pattern due to the different materials, paper or a woodbased-material board. The reason for this discrepancy is that, on the one hand, a different ink is used for printing the proof paper and, on the other hand, the application method in the form of printed dots (pixels) differs from the application of a printing ink onto a woodbased-material board generally carried out with the aid of an anilox roller.

Conventionally, a motif provided by a purchaser is converted into a data set which already contains a certain number of control parameters to control an inkjet printer. An inkjet printer is now operated with the aid of the data set to print the motif onto a decorative paper. A decorative paper obtained in this manner is submitted to the purchaser and, if it is approved, the existing data set is used to design a further data set that is used to engrave a print roller to be used for printing. An engraving of this type is preferably made with the aid of a laser.

The second data set is therefore already different with which the motif is now printed onto a woodbased-material board using correct printing ink, and this board is compared to the proof paper. If the comparison proves to be negative, and the two prints are not consistent, the data set is used to start another printing, which may also require one or more baby rollers to be split off. If a satisfactory printing on a woodbased-material board is now finally achieved, the woodbased-material board, e.g., to produce a flooring panel, is provided with an abrasion-resistant layer and pressed in a so-called short-cycle press.

The changes that are inevitably produced during pressing and the preceding coating necessitate another comparison of the proof paper with the end result regarding the optical appearance of the motif printed on the board. If unacceptable deviations are found, another attempt must be made to match the proof paper and the end result by changing the conditions prevailing during the coating and/or pressing process. A method of this type may be very time-consuming as well as ultimately cost-intensive.

It is known from EP 1 145 863 B1 to produce a sample print on an inkjet printer. The base material should resemble the gravure paper used for the serial print in terms of brilliance or degree of brightness and gloss. To this end, regular gravure paper is provided with an ink-receiving layer that is as transparent as possible.

It is known from the publication "Farbmanagement and Rastererhalt in einem Proof" in Druckspiegel (dated January 2003, pages 20 through 22) to control an inkjet printer with the same data set with which a printing plate is written. A test system of this type is known, e.g., in the "Digitaler Kontraktproof von Rasterdaten" data sheet.

The advantages and disadvantages of the raster proof, which depend on the print products and the customer requirements, are discussed in the journal www.value-magazine.de "Gerasteter Digitalproof," April 2006.

SUMMARY OF THE INVENTION

The invention ensures that the greatest possible conformity is achieved between a sample provided for inspection and a series-manufactured end project. This is achieved according to the invention through a method for producing a same pattern, comprising a plurality of image points, on at least one side of base materials from one original data set. The method comprises:

Printing the pattern on one side of a first base material as a sample print with an inkjet printer;
Covering the pattern with a synthetic resin layer;
Pressing the first base material with the pattern and the synthetic resin layer;
Printing the pattern on one side of a second base material by means of a print roller with a raster in an intaglio printing process;
Covering the pattern with a synthetic resin layer; and
Pressing the second base material with the pattern and the synthetic resin layer.

In this method, the original digital data set is used to control the inkjet printer as well as to produce the print roller, so that when the two printed images are compared, the number of image points per unit area on the first base material is essentially the same as the number of image points per unit area on the second base material. The size of the image points and the nozzle spacing of the inkjet printer are coordinated with the size of the screen dots and the raster sizes in the intaglio printing process. Identical printing liquids are used for the inkjet print and the intaglio print.

A device is provided for printing, coating and pressing two different base materials with the same pattern, which is covered with a synthetic resin and subsequently pressed therewith. The device has a first printing line and a second printing line. The pattern is applied to the first base material with the aid of an inkjet printer in the first printing line, and the same pattern is applied to a second base material with the aid of an intaglio printing device in the second printing line. The test unit is provided on an exit side with an optical scan element and a comparison unit to compare the printing results of the first and second printing line with respect to optical appearance.

According to the invention, the sample workpiece used for an initial inspection, the first base material and the series-manufactured end product are produced using such materials and/or conditions that lead to an identical or essentially identical result of both printing methods with respect to optical appearance. The same optical appearance to the observer of both prints is the decisive factor.

In the invention, a pattern print produced on a second base material by an intaglio printing process is coordinated with a sample print produced on a first base material by an inkjet printing method. The parameters prevailing in the respective printing process and characterizing the respective print with respect to the appearance of the respective printing result are largely matched to one another. To this end, the print roller has a raster to take up the ink, the size and shape of which raster is responsible for the quantity of ink. Ideally, one screen dot corresponds to one image point.

The number of the image points respectively produced per unit area is adjusted in both methods such that a printing result is obtained with an essentially identical appearance. This is carried out by adjusting the size of the image points and the nozzle spacings of the inkjet printing method to the size of the screen dots and the raster sizes in the intaglio printing process. One screen dot ideally corresponds to one image point.

The printing liquids or printing inks used are selected such that an essentially identical appearance is produced with both printing methods. To this end, identical printing liquids or printing inks should be used, since otherwise chromatic aberrations, so-called metamers, can occur. Metamers are understood to describe when colors that appear identical in a certain light, prove to be different when the light source changes. This occurs in particular when different pigment combinations are used. By adjusting the respective binders, solvents and pigments an essentially identical printing result is advantageously obtained with respect to optical appearance with both printing methods. In this manner, printing result accurate conclusions can be drawn using the sample print regarding the serial printing of the respective pattern to be anticipated.

Advantageously, the same base material is used for the sample print and the pattern print so that the comparison of the two printed images with one another is more effective because the same base materials are used. Advantageously woodbased-material, synthetic, stone or linoleum boards can be used as base materials. However, it is also possible to use conventional decorative papers as a base material.

It has proven to be useful to carry out the step of comparing the result of the sample print with the actual pattern print after the coating and pressing of the sample print with the carrier in order to be able to compare a sample print and pattern print as close as possible to a serial printing. In order to obtain the closest possible imitation of the natural material, it is advantageous if a surface relief synchronous to the pattern is embossed with the aid of a surface stamping die during the pressing the pattern print and the coated sample print with the base material. The base material provided with the pattern print and the base material provided with the sample print are advantageously provided with a chamfer on at least two opposite edges. Printing the pattern is advantageously carried out in an indirect intaglio printing process in which the printing liquids are applied to the base material indirectly via a rubber roll in order to even out irregularities in the base material while obtaining a uniform printed image.

It has proven to be possible to produce the print roller for the intaglio printing process with the aid of a laser, an etching process or with the aid of the erosion process. A particularly precise engraving of the print roller can be achieved through these methods.

The device advantageously has a first printing line and a second printing line. The pattern is applied to a first base material with the aid of an inkjet printer in the first printing line. The same pattern is applied to a second base material with the aid of an intaglio printing device in the second printing line. A test unit with an optical scan element and a comparison unit for comparing the printing results of the first and second printing line with respect to optical appearance is provided at the exit side. This renders possible an effective comparison of the two printing results.

The test device is used for the optical recording of a printed image. The test device uses an optical scan element, which can comprise, e.g., a CCD element (charge-coupled device). A CCD element is an electronic component that is used in optical devices. With the CCD, the image strength can be finely rasterized, measured in a spatially resolving manner. The aim is to obtain the most precise image possible for subsequent storage and reproduction. The comparison unit, e.g., a computer carries out a comparison of the two printed images via a preset algorithm to determine the degree of conformity.

It has proven to be advantageous for the optical scan element to contain a control unit in which the results obtained in the scanning process can be compared to a preset data set. If there is conformity or if the deviations are acceptable, a switching pulse can be transmitted to control the second printing line so that a cost-effective comparison of the two printed images is possible. The pattern in the second printing line can be advantageously applied indirectly to the second support board via a rubber roll with an indirect printing process in order to even out irregularities in the support board.

A method for producing a same pattern comprising a plurality of image points on respectively one side of two different base materials from an original digital data set comprises: printing a pattern on one side of a first base material as a sample print; covering the pattern with a synthetic resin layer; pressing the first base material with the pattern and the synthetic resin layer; printing the pattern on one side of a second base material; covering the pattern on the second base material with a synthetic resin layer; and pressing the second base material with the pattern and the synthetic resin layer. The original digital data set controls the printing on the first base material and the second base material so that a number of image points per unit area on the first base material essentially corresponds to a number of image points per unit area on the second base material. A size of the image points and nozzle spacings of the printing on the first base material are coordinated with a size of screen dots and raster sizes in a printing process of the second based material. Identical printing liquids are used for the printing of the pattern on the first base material and the second based material.

A further method of printing comprises: providing a pattern in a form of original data; generating a data set used in a printing process generated from the original data; printing a first material board using the data set; coating the first material board with at least a first synthetic resin-based layer; pressing the at least first synthetic resin layer with the printed first material board in a short-cycle press; generating a further data set from the original data as the basis for an indirect printing process; adding control parameters for controlling a laser to the original data; and engraving a print roller according to the original data with aid of the control parameters. The further data set and the data set are analogously generated from the original data by addition of respective corresponding control parameters. The method further comprises printing the pattern on one side of a second material board with the print roller using the further data set; covering the pattern on the second material board with a synthetic resin layer; and pressing the second material board with the pattern and the synthetic resin layer.

In aspect of the invention, the method further includes providing a pattern is obtained by photographing an original pattern by a digital camera. The at least first synthetic resin layer contains melamine resin or resinous resin. The at least first synthetic resin layer contains embedded corundum particles. The data set contains additional control data or control parameters to control inkjet nozzles. The original data controls the printing on the first material board and the second material board so that a number of image points per unit area on the first material board essentially corresponds to a number of image points per unit area on the second material boar. A size of the image points and nozzle spacings of the printing on the first material board are coordinated with a size of screen dots and raster sizes in a printing process of the second material board. Identical printing liquids are used for the printing of the pattern on the first material board and the second material board.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1a-d represent a process flow and device according to the invention.

DETAILED DESCRIPTION OF THE PRESENT INVENTION

Figure 1C:
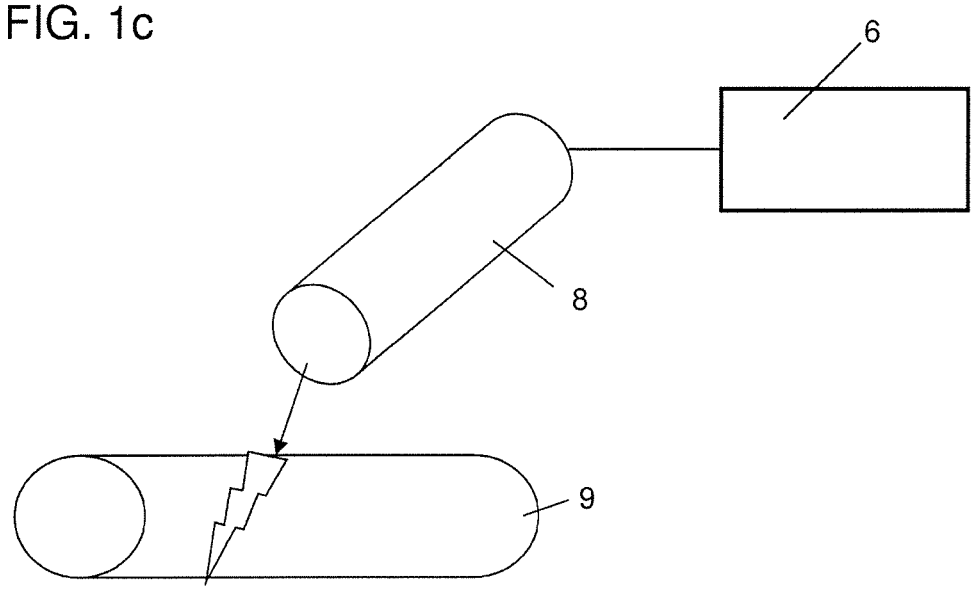

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Referring to FIG. 1a, a pattern, e.g., in the form of a wood grain, is provided in the form of original data 1 obtained by photographing an original pattern by a digital camera. A data set 4 that can be used in an inkjet printer 3 is generated from the original data 1 with the aid of an electronic device 2. In addition to the original data 1, the data set 4 contains additional control data or control parameters 4a to control inkjet nozzles. A woodbased-material board 5 is now printed with the aid of the inkjet printer.

A printing ink suitable for series production is used as a printing medium. Within the scope of the invention, the ink withstands the high pressure and the temperature stresses in the pressing operation of the woodbased-material board in a short-cycle press as is known in the art. After printing, the woodbased-material board 5 is coated with a first synthetic resin-based layer that preferably contains melamine resin or resinous resin. According to the invention, corundum particles are embedded in this first layer to establish the desired abrasion-resistance.

Another likewise synthetic resin-based finish coating is applied to the first layer. The synthetic resin layers are pressed with the printed woodbased-material board 5 in a short-cycle press in a manner known to those of ordinary skill in the art. The product thus obtained, having small dimensions of preferably board lengths between 1 to 2 m and board widths of the same kind, can now be studied with regard to its optical appearance.

Referring to FIG. 1b, if the pattern applied with the aid of the inkjet printer 3 meets the requirements of the purchaser or customer, a further data set 6 can be generated from the original data 1 according to the data set 4 as the basis for an indirect intaglio printing process. This provides advantages in particular if woodbased-material boards provided with the desired pattern are to be produced in large production runs As further shown in FIG. 1b, control parameters 6a for controlling a laser 8 (see, FIG. 1c) are added to the original data 1 with an electronic, preferably computer-operated read/write device shown by reference number 7 in a general manner. As further shown in FIG. 1c, a print roller 9 is engraved according to the original data 1 with the aid of the control parameters 6a. According to the invention the further data set 6 as well as the data set 4 are analogously generated from the original data 1 by addition of the respective corresponding control parameters.

Figure 1D:
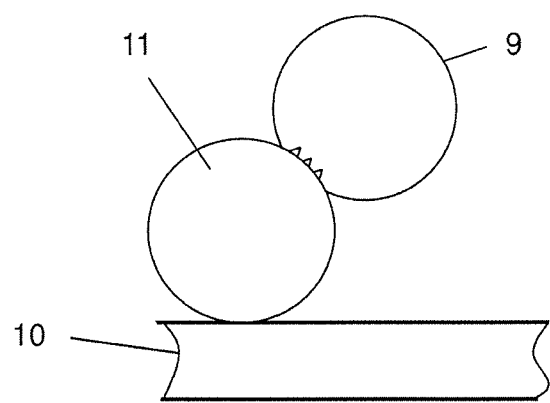

After the completion of the print roller 9 by engraving, e.g., laser engraving, the printing of large sized woodbased-material boards 10 is carried out as shown in FIG. 1d. This printing can be carried out in a conventional intaglio printing process using a printing ink used in the inkjet printing process and a corresponding printing color in terms of the optical image in a series production installation. The pattern corresponding to the original data 1 is applied via a form roller 11. A conformity in terms of optical appearance is thus ensured according to the invention between the woodbased-material board 5 produced for inspecting a small production run (sample run) of approximately one to ten and with small dimensions and the woodbased-material boards 10 provided with the same pattern in a series production process.

As should be understood, the original digital data set controls the printing on the first base material and the second base material so that a number of image points per unit area on the first base material essentially corresponds to a number of image points per unit area on the second base material. Also, a size of the image points and nozzle spacings of the printing on the first base material are coordinated with a size of screen dots and raster sizes in a printing process of the second based material, and identical printing liquids are used for the printing of the pattern on the first base material and the second based material.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A device for printing, coating and pressing two different base materials with a same pattern, which is covered with a synthetic resin and subsequently pressed therewith, wherein the device comprises a first printing line and a second printing line, a pattern is applied to a first base material as a sample print using an inkjet printer in the first printing line and a same pattern is applied to a second base material using an intaglio printing device in the second printing line, and a test unit provided on an exit side with an optical scan element and a comparison unit compares the printing results of the first and second printing line with respect to optical appearance.

2. The device according to claim 1, wherein the optical scan element has a control unit in which results obtained in a scanning process are compared to a preset data set, and if there is conformity or if the deviations are acceptable a switching pulse is transmitted to control the second printing line.

3. The device according to claim 1, wherein the pattern is applied with an indirect intaglio printing device in the second printing line.

4. The device according to claim 1, wherein identical printing liquids or printing inks are used for the pattern applied to the first base material and the second base material.

5. The device according to claim 1, wherein the first base material and the second base material are same base materials.

6. The device according to claim 5, wherein the same base materials are woodbased-material, synthetic, stone or linoleum boards.

7. The device according to claim 5, wherein the same base materials are decorative papers.

8. The device according to claim 1, wherein the first base material and the second base material are provided with a chamfer on at least two opposite edges.

9. The device according to claim 1, wherein the pattern is applied with an indirect intaglio printing device in the second printing line in which printing liquids are applied to the second base material indirectly via a rubber roll in order to even out irregularities.

10. The device according to claim 1, wherein the optical scan element is a charge-coupled device.

11. The device according to claim 10, wherein the optical scan element contains a control unit in which results obtained in a scanning process are compared to a preset data set.

12. The device according to claim 11, wherein when conformity or deviations are acceptable, a switching pulse will be transmitted to control the second printing line.

13. The device according to claim 11, wherein the synthetic resin contains melamine resin or resinous resin which is coated on a woodbased-material board.

14. The device according to claim 13, wherein corundum particles are embedded into the synthetic resin.

15. The device according to claim 14, wherein the synthetic resin is pressed with the printed woodbased-material board in a short-cycle press.

* * * * *